(12) United States Patent
Suciu et al.

(10) Patent No.: US 10,202,856 B2
(45) Date of Patent: Feb. 12, 2019

(54) DECOUPLED GAS TURBINE ENGINE

(71) Applicant: United Technologies Corporation, Hartford, CT (US)

(72) Inventors: Gabriel L. Suciu, Glastonbury, CT (US); Stephen K. Kramer, Cromwell, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 158 days.

(21) Appl. No.: 14/842,404

(22) Filed: Sep. 1, 2015

(65) Prior Publication Data

US 2016/0061045 A1 Mar. 3, 2016

Related U.S. Application Data

(60) Provisional application No. 62/044,697, filed on Sep. 2, 2014.

(51) Int. Cl.
| | |
|---|---|
| *F01D 13/00* | (2006.01) |
| *F01D 9/02* | (2006.01) |
| *F02C 3/04* | (2006.01) |
| *F01D 5/04* | (2006.01) |
| *F01D 5/06* | (2006.01) |

(Continued)

(52) U.S. Cl.
CPC ............. *F01D 9/02* (2013.01); *F01D 5/04* (2013.01); *F01D 5/06* (2013.01); *F01D 13/003* (2013.01); *F02C 3/04* (2013.01); *F02C 3/05* (2013.01); *F02C 3/085* (2013.01); *F02C 3/10* (2013.01); *F02C 3/103* (2013.01); *F02C 3/14* (2013.01); *F02C 7/04* (2013.01); *F05D 2220/32* (2013.01); *F05D 2240/24* (2013.01); (Continued)

(58) Field of Classification Search
CPC ...... F01D 9/02; F01D 5/04; F01D 5/06; F01D 13/003; F01D 9/023; F01D 9/026; F01D 9/06; F01C 3/04; F05D 2250/314; F05D 2250/31; F05D 2250/312; F05D 2240/60; F02C 3/08; F02C 3/085; F02C 7/36; F02C 3/04; F02C 3/103; F02C 3/14; F02C 3/145; F23R 3/42; F23R 3/44; F23R 2900/03342; F23R 3/425; F23R 3/46; F23R 3/52; F23R 3/54; F02K 3/00
See application file for complete search history.

(56) References Cited

U.S. PATENT DOCUMENTS 2,095,991 A * 10/1937 Lysholm .................... F02C 9/28
                                                        290/2
2,625,012 A *  1/1953 Larrecq ..................... F02C 3/36
                                                      415/199.6
(Continued)

OTHER PUBLICATIONS

EP search report for EP15183631.9 dated Jan. 20, 2016.

*Primary Examiner* — Gerald L Sung
*Assistant Examiner* — Marc Amar
(74) *Attorney, Agent, or Firm* — O'Shea Getz P.C.

(57) ABSTRACT

A decoupled gas turbine engine includes a high spool assembly and a low spool assembly each having a rotational axis that are spaced from one-another. The engine further includes a combustor that may have a centerline spaced from the rotational axes of each spool assembly. Turning ducts of the engine are configured to re-direct airflow from one spool assembly to the next and/or between one spool assembly and the combustor.

6 Claims, 6 Drawing Sheets

(51) Int. Cl.
*F02C 7/04* (2006.01)
*F02C 3/14* (2006.01)
*F02C 3/05* (2006.01)
*F02C 3/08* (2006.01)
*F02C 3/10* (2006.01)

(52) U.S. Cl.
CPC .... *F05D 2240/35* (2013.01); *F05D 2250/312* (2013.01); *F05D 2250/314* (2013.01)

(56) References Cited

U.S. PATENT DOCUMENTS

| | | | | |
|---|---|---|---|---|
| 2,677,932 A | * | 5/1954 | Forsling | F02C 3/10 60/224 |
| 3,209,536 A | * | 10/1965 | Howes | F02C 3/10 417/405 |
| 4,286,430 A | * | 9/1981 | Smith | F02C 3/10 60/226.1 |
| 4,641,495 A | * | 2/1987 | Mowill | F02C 3/103 415/199.1 |
| 4,813,228 A | * | 3/1989 | Hueller | F02C 3/10 60/39.511 |
| 5,081,832 A | * | 1/1992 | Mowill | F02C 3/36 60/792 |
| 5,097,660 A | * | 3/1992 | Shekleton | F01D 5/046 415/115 |
| 6,390,418 B1 | | 5/2002 | McCormick et al. | |
| 7,631,480 B2 | | 12/2009 | Suciu et al. | |
| 7,762,085 B2 | * | 7/2010 | Exley | B64C 27/82 60/791 |
| 8,671,685 B2 | * | 3/2014 | Teets | F02C 1/06 60/641.11 |
| 8,789,354 B2 | | 7/2014 | Suciu et al. | |
| 8,955,304 B2 | | 2/2015 | Suciu et al. | |
| 9,200,531 B2 | | 12/2015 | Robertson, Jr. et al. | |
| 9,200,569 B2 | | 12/2015 | Suciu et al. | |
| 9,200,592 B2 | | 12/2015 | Berryann et al. | |
| 9,297,305 B2 | * | 3/2016 | Drachsler | F02C 3/05 |
| 2006/0185346 A1 | * | 8/2006 | Rolt | F02K 3/06 60/224 |
| 2006/0248899 A1 | | 11/2006 | Borchert | |
| 2009/0056309 A1 | | 3/2009 | Roberge | |
| 2010/0154435 A1 | * | 6/2010 | Exley | B64C 27/82 60/792 |
| 2011/0056208 A1 | | 3/2011 | Norris et al. | |
| 2011/0203282 A1 | * | 8/2011 | Charron | F01D 9/023 60/722 |
| 2011/0214406 A1 | * | 9/2011 | Teets | F02C 1/06 60/39.17 |
| 2012/0167591 A1 | * | 7/2012 | Drachsler | F02C 3/05 60/792 |
| 2012/0272656 A1 | * | 11/2012 | Norris | F02C 3/145 60/772 |
| 2013/0074516 A1 | | 3/2013 | Heward et al. | |
| 2013/0205747 A1 | * | 8/2013 | Suciu | F02K 3/06 60/39.15 |
| 2013/0205752 A1 | * | 8/2013 | Suciu | F02K 3/025 60/226.1 |
| 2015/0322855 A1 | | 11/2015 | Kupratis | |

* cited by examiner

DECOUPLED GAS TURBINE ENGINE

This application claims priority to U.S. Patent Appln. No. 62/044,697 filed Sep. 2, 2014.

BACKGROUND

The present disclosure relates to a gas turbine engines, and more particularly to a decoupled gas turbine engine.

Known gas turbine engines for both land based (e.g. industrial gas turbines) and aircraft applications (e.g. planes and vertical lift applications such as helicopters) typically include at least two concentrically located spools, having a common engine axis. The spools generally interconnect a compressor and a turbine section interposed by a concentrically located combustor. In a turbofan application, the engine may further include a fan that drives air along a bypass flowpath while the compressor section drives air along a core flowpath for compression and communication into the combustor then expansion through the turbine section. In a two spool application, the engine generally includes a low spool and a high spool mounted for rotation about the engine axis via several bearing structures and relative to a static engine case. The low spool generally includes an inner shaft that interconnects the fan, a low pressure compressor ("LPC") of the compressor section and a low pressure turbine ("LPT") of the turbine section. The inner shaft may typically be configured to drive the fan.

The high spool includes an outer shaft that interconnects a high pressure compressor ("HPC") of the compressor section and a high pressure turbine ("HPT") of the turbine section. The combustor is arranged between the HPC and the HPT. The concentric inner and outer shafts both rotate about the engine axis. Core airflow is compressed by the LPC then the HPC, mixed with the fuel and burned in the combustor, then expanded over the HPT and the LPT. The LPT and HPT rotationally drive the respective low spool and high spool in response to the expansion.

Unfortunately, the concentric nature of such engines makes it difficult to obtain high operating pressure ratios while maintaining/achieving small engine core size. Further, packaging space for the engine may be limited, and achieving optimal dimensional tolerances with known manufacturing techniques may be difficult to obtain especially for smaller engines.

SUMMARY

A gas turbine engine according to one, non-limiting, embodiment of the present disclosure includes a high spool assembly having a first axis; and a low spool assembly in fluid communication with the high spool assembly and having a second axis disposed outward from the first axis.

Additionally to the foregoing embodiment, the engine includes a combustor; and wherein the high spool assembly includes a high pressure compressor, a high pressure turbine and a first shaft orientated to rotate about the first axis and connected to the high pressure compressor and high pressure turbine, and wherein the low spool assembly includes a low pressure compressor, a low pressure turbine and a second shaft orientated to rotate about the second axis and connected to the low pressure compressor and low pressure turbine, and wherein the combustor is in fluid communication between the high pressure compressor and the high pressure turbine.

In the alternative or additionally thereto, in the foregoing embodiment the engine includes a low pressure compressor of the low spool assembly; a high pressure compressor of the high spool assembly; and a turning duct disposed between the low and high pressure compressors for re-directing air flowing from the low pressure compressor to the high pressure compressor.

In the alternative or additionally thereto, in the foregoing embodiment, the engine includes a high pressure turbine of the high spool assembly; a low pressure turbine of the low spool assembly; and a turning duct disposed between the high and low pressure turbines for re-directing air flowing from the high pressure turbine to the low pressure turbine.

In the alternative or additionally thereto, in the foregoing embodiment, the engine includes a first turning duct disposed between the high pressure compressor and the combustor for re-directing air flowing from the high pressure compressor to the combustor.

In the alternative or additionally thereto, in the foregoing embodiment, the engine includes a second turning duct disposed between the combustor and the high pressure turbine for re-directing air flowing from the combustor to the high pressure turbine.

In the alternative or additionally thereto, in the foregoing embodiment, the combustor is at least one can combustor.

In the alternative or additionally thereto, in the foregoing embodiment, the combustor has a centerline spaced from the first and second axis.

In the alternative or additionally thereto, in the foregoing embodiment, the first and second axis and the centerline are substantially parallel to one-another.

In the alternative or additionally thereto, in the foregoing embodiment, the first axis is angled with respect to the second axis.

In the alternative or additionally thereto, in the foregoing embodiment, the low and high pressure turbines are radial in-flow turbines.

In the alternative or additionally thereto, in the foregoing embodiment, the low and high pressure compressors are radial compressors.

A decoupled gas turbine engine according to another, non-limiting, embodiment includes a compressor; a combustor; a turbine; a first turning duct in fluid communication between the compressor and the combustor; and a second turning duct in fluid communication between the combustor and the turbine.

Additionally to the foregoing embodiment, the first and second turning ducts each include an annular portion having an annular flow cross section and a bent portion for re-directing airflow.

In the alternative or additionally thereto, in the foregoing embodiment, the annular portion of the first turning duct is disposed downstream of and in fluid communication with the compressor and the bent portion of the first turning duct is disposed upstream of and in fluid communication with the combustor.

In the alternative or additionally thereto, in the foregoing embodiment, the bent portion of the second turning duct is disposed downstream of and in fluid communication with the combustor and the annular portion of the second turning duct is disposed upstream of and in fluid communication with the turbine.

In the alternative or additionally thereto, in the foregoing embodiment, the turbine is a radial in-flow turbine.

In the alternative or additionally thereto, in the foregoing embodiment, the first and second turning vanes each include a circumferential portion disposed and in fluid communication between the annular portion and the bent portion, and the circumferential portion has a diverging flow cross section as the circumferential portion extends circumferentially toward the bent portion.

In the alternative or additionally thereto, in the foregoing embodiment, the first turning duct includes an upstream portion having radial inner and outer casings with respect to a compressor axis, and defining an annular flowpath communicating between a circumferentially continuous, axial facing, inlet and a circumferentially continuous, radially facing, outlet.

In the alternative or additionally thereto, in the foregoing embodiment, the first turning duct includes a generally tubular portion engaged to the upstream portion and defining a circumferential flowpath in lateral communication with the outlet and having a flow cross section that diverges toward an end of the circumferential flowpath, and includes a downstream portion engaged to the tubular portion and defining a re-directing flowpath in fluid communication with the end of the circumferential flowpath.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
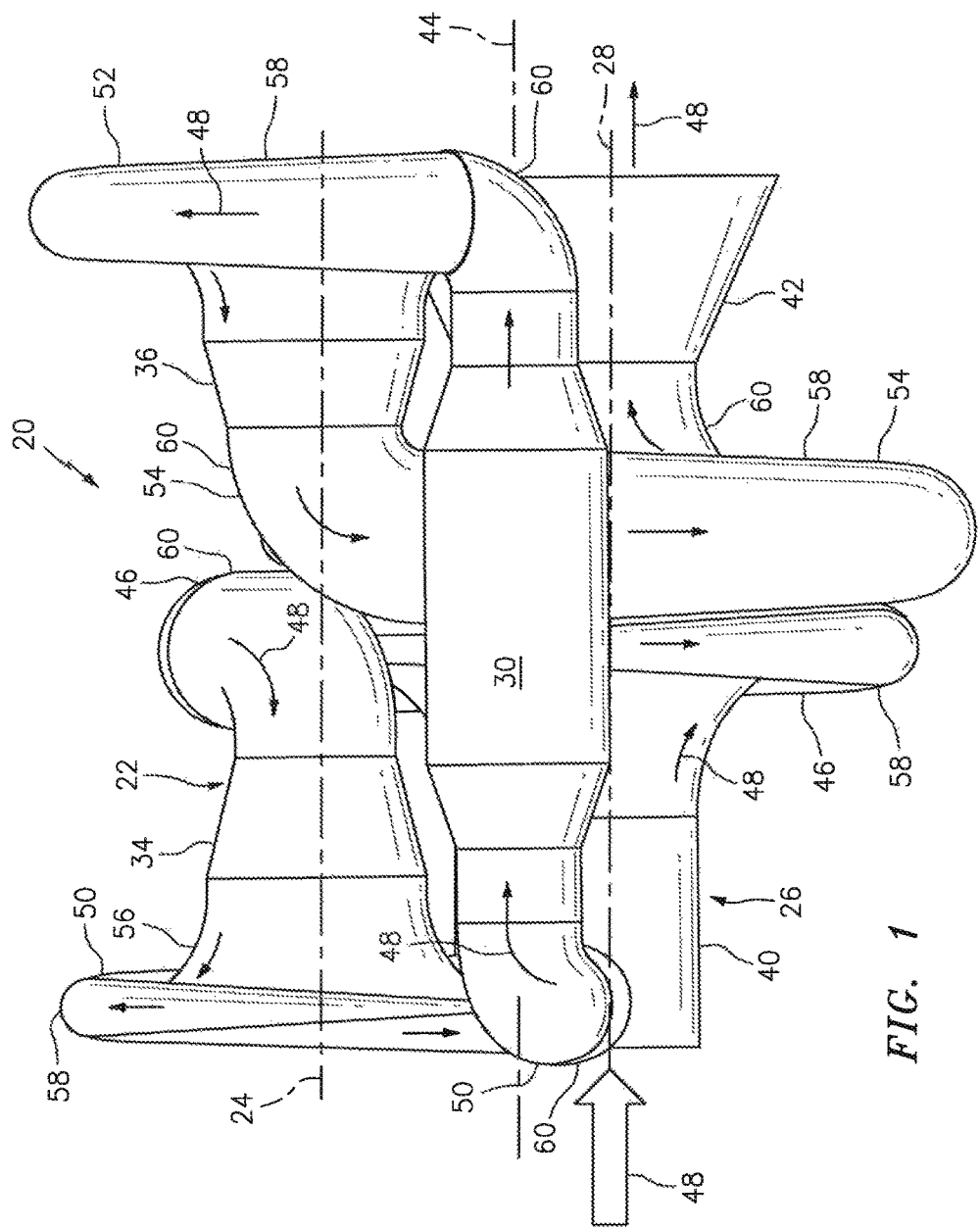
FIG. 1 is a perspective view of a decoupled gas turbine engine according to one, non-limiting embodiment of the present disclosure.
Figure 2:
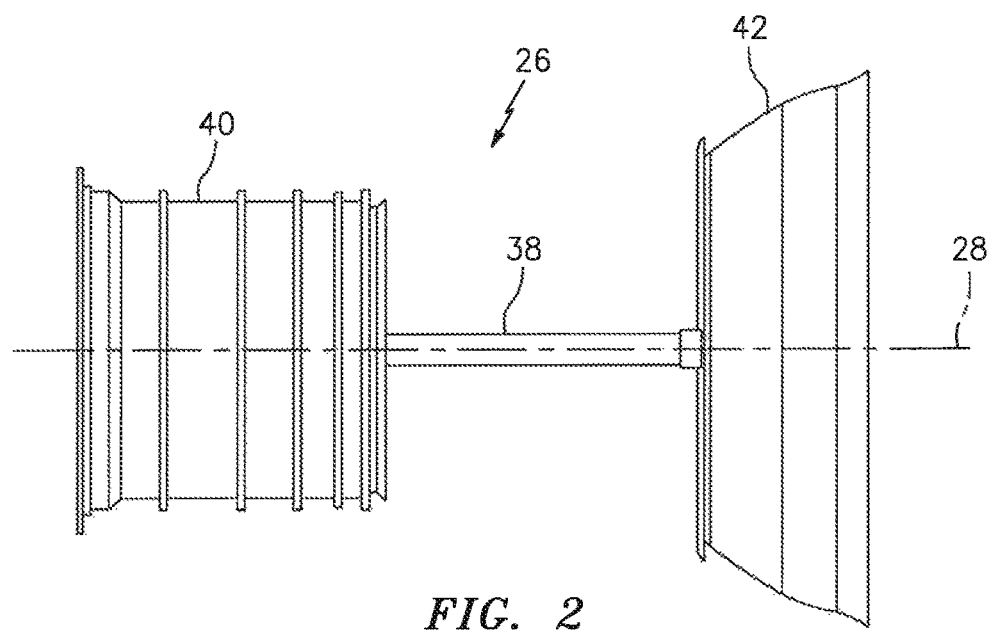
FIG. 2 is a perspective view of a low spool assembly of the engine.
Figure 3:
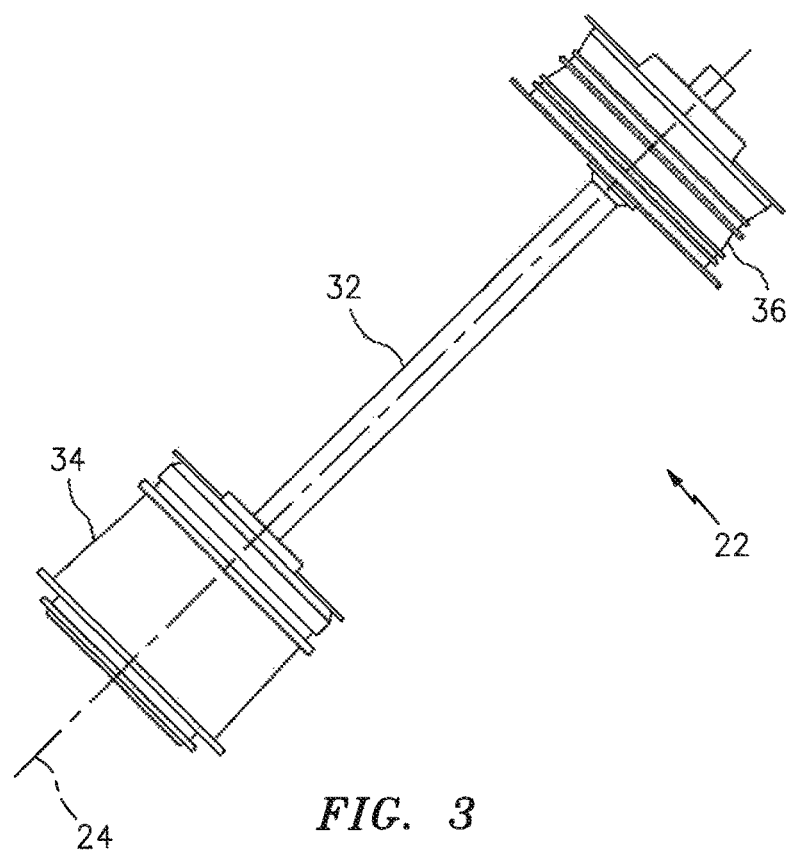
FIG. 3 is a perspective view of a high spool assembly of the engine.
Figure 4:
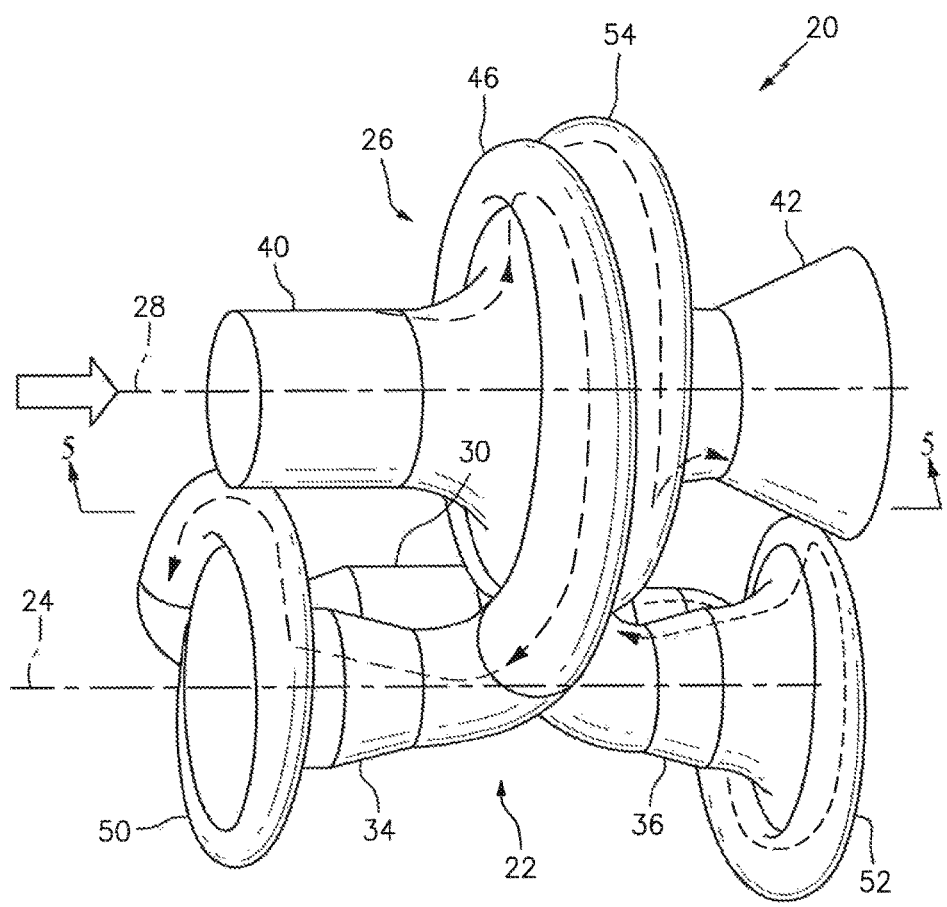
FIG. 4 is another perspective view of the engine.

Referring to FIGS. 1 through 4, a decoupled gas turbine engine 20 is disclosed as a two-spool engine having a high spool assembly 22 orientated to rotate about a first axis 24, a low spool assembly 26 orientated to rotate about a second axis 28, and an interposed combustor 30. The first and second axes 24, 28 are spaced apart, and thus not common to one-another. The high spool assembly 22 may include a shaft 32 extending along the first axis 24, a high pressure compressor (HPC) 34 and a high pressure turbine (HPT) 36. The HPC 34 and HPT 36 are connected to and axially spaced along the shaft 32. The low spool assembly 26 may include a shaft 38 extending along the second axis 28, a low pressure compressor (LPC) 40 and a low pressure turbine (LPT) 42. The LPC 40 and LPT 42 are connected to and axially spaced along the shaft 38. It is further contemplated and understood that the engine 20 may be land-based (i.e. industrial gas turbine), may be a turbofan engine having a leading fan (not shown), and may further be applied to planes or vertical lift applications such as helicopters. Yet further, the engine 20 may include more than two spool assemblies each having rotational axis that may not be concentric to one-another, thus are considered to be 'decoupled'.

The combustor 30 includes a centerline 44 that may be spaced from the first and second axes 24, 28 of the respective high and low spool assemblies 22, 26. Depending upon the engine application, the assemblies 22, 26 and combustor 30 (with respect to axes 24, 28 and centerline 44) may generally be axially aligned, spaced radially outward from one another, and orientated substantially parallel to one-another. The combustor 30 may be a 'can' combustor as is generally known in the art. It is further contemplated and understood that the combustor 30 may include a plurality of can combustors and/or the axes 24, 28 and centerline 44 (although spaced apart) may not be parallel to one-another, but at least one angled with respect to the other(s) (see FIG. 6).

The engine 20 may further include a first turning duct 46 for redirecting core airflow (see arrow 48) from the LPC 40 of the low spool assembly 26 to the HPC 34 of the high spool assembly 22, a second turning duct 50 for re-directing airflow 48 from the HPC 34 to the combustor 30, a third turning duct 52 for re-directing airflow 48 from the combustor 30 to the HPT 36 of the high spool assembly 22, and a fourth turning duct 54 for re-directing airflow 48 from the HPT 36 to the LPT 42 of the low spool assembly 26. In association with the various duct orientations, the HPT 36 and LPT 42 may be radial in-flow turbines. Similarly, the HPC 34 and LPC 40 may be axi-centrifugal compressors (i.e. radial compressors).

Figure 5:
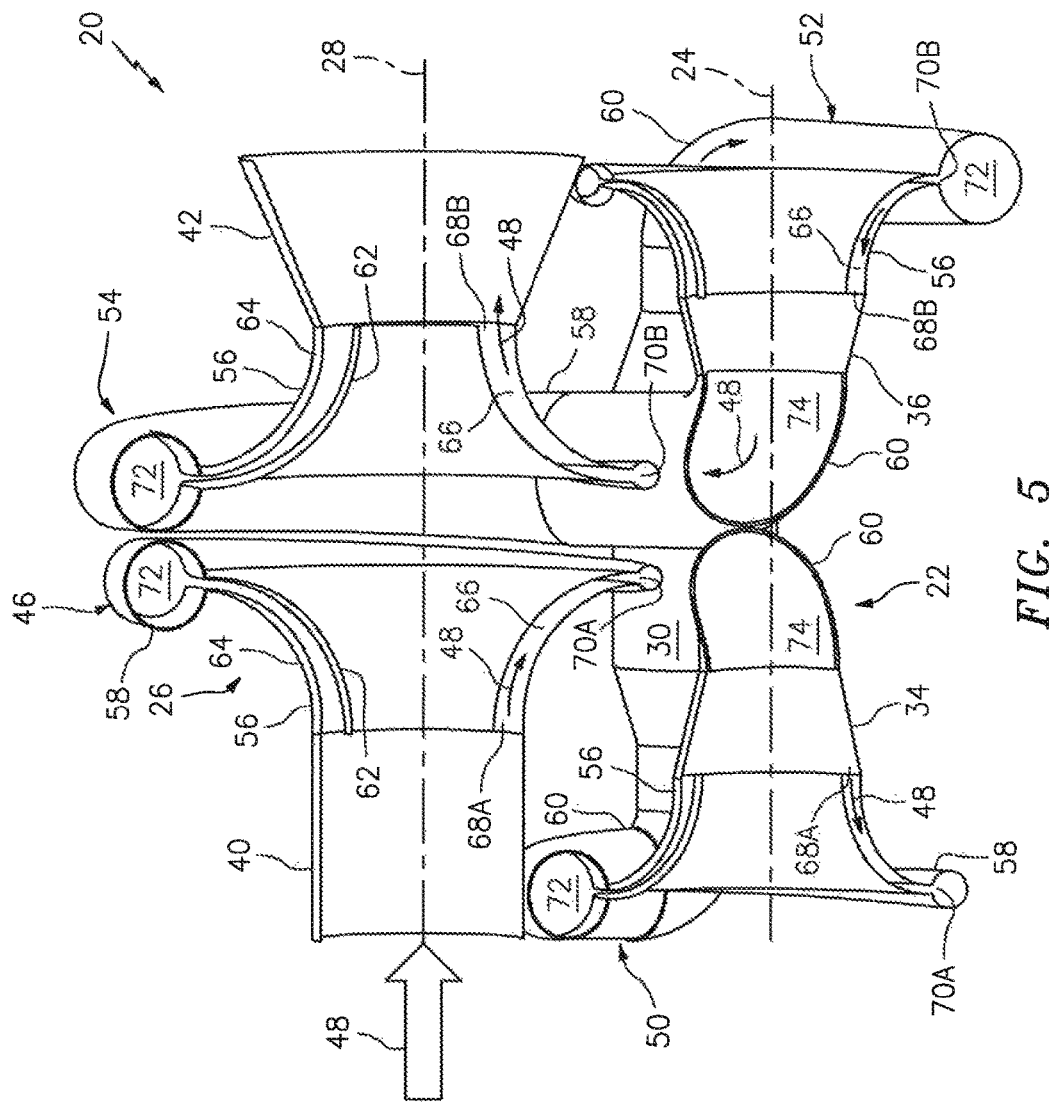
FIG. 5 is a cross section of the engine taken along line 5-5 of FIG. 4.

Referring to FIGS. 1 and 5, each turning duct 46, 50, 52, 54 may generally include a trumpet-shaped, annular portion 56, a mid, tubular portion 58, and a flow redirecting or bent portion 60. With regard to turning ducts 46, 50, core airflow 48 first enters the annular portion 56, flows through the tubular portion 58, and is then generally redirected and flows out through the bent portion 60. With regard to turning ducts 52, 54, the airflow is generally reversed, thus first enters the bent portion 60, flows through the tubular portion 58, and then exits through the annular portion 56.

The annular portion 56 may include an inner casing 62 radially spaced inward from an outer casing 64 thereby defining an annular flowpath 66. With regard to turning ducts 46, 50, the annular flowpath 66 is in fluid communication between an axial facing and circumferentially continuous inlet 68A and a radially facing and circumferentially continuous outlet or end 70A. The inlet 68A is generally defined by respective circular edges of the respective casings 62, 64 engaged to the respective LPC 40 and HPC 34. The outlet 70A is generally defined by respective circular edges (i.e. opposite the edges defining the inlet) of the respective casings 62, 64 engaged to the tubular portions 58 of the respective turning ducts 46, 50. That is, the outlet 70A may generally be viewed as a circular slit in the tubular portion 58.

With regard to turning ducts 52, 54, the annular flowpath 66 is in fluid communication between an axial facing and circumferentially continuous outlet or end 68B and a radially facing and circumferentially continuous inlet 70B. The outlet 68B is generally defined by respective circular edges of the respective casings 62, 64 engaged to the respective LPT 42 and HPT 36. The inlet 70B is generally defined by respective circular edges (i.e. opposite the edges defining the outlet) of the respective casings 62, 64 engaged to the tubular portions 58 of the respective turning ducts 52, 54. That is, the inlet 70B may generally be viewed as a circular slit in the tubular portion 58.

The hollow tubular portion 58 of each turning duct 46, 50, 52, 54 generally forms a split ring and extends circumferentially along the radially outward perimeter of the annular portion 56. Portion 58 generally defines a circumferentially extending flowpath 72 having a flow cross section that may be generally round and may increase in flow area (i.e. diverges) as the portion circumferentially extends toward the bent portion 60. The flowpath 72 is in direct fluid communication with the outlets 70A of the annular flowpath 66 of the turning ducts 46, 50, and the inlets 70B of the annular flowpath 66 of the turning ducts 52, 54. More specifically, the longitude of flowpath 72 extends circumferentially and each flowpath 72 laterally communicates with the respective outlets 70A of the ducts 46, 50 and respective inlets 70B of the ducts 52, 54.

The hollow bent portion 60 of each duct 46, 50, 52, 54 defines a flowpath 74 that is in direct fluid communication with the flowpath 72 of the tubular portion 58. Like the tubular portion 58, the bent portion 60 may also be tubular having a substantially round flow cross section. Unlike the tubular portion 58, the bent portion 60 does not extend circumferentially but may be bent (about ninety degrees in the present example) to generally re-direct core airflow 48 from one spool to the next or between the combustor 30 and spool assemblies 22, 26. The flowpath 74 of the bent portion 60 is in direct fluid communication with a longitudinal end of the flowpath 72 of the tubular portion 58.

During operation of the decoupled gas turbine engine 20, airflow 48 enters the LPC 40 of the low spool assembly 26, is worked by multiple stages of vanes and blades driven by the rotating shaft 38 (not shown but known in the art), and exits under low pressure through the inlet 68A and into the annular flowpath 66 of the duct 46. The airflow 48 then travels through the outlet 70A of the annular portion 56 and enters the circumferential flowpath 72 of the tubular portion 58. The mass flow rate generally increases along the flowpath 72 with the increasing flow cross section, and until the airflow 48 enters the re-directing flowpath 74 of the bent portion 60.

From the flowpath 74 of the bent portion 60 of duct 46, the airflow 48 is re-directed from the low spool assembly 26 and enters the HPC 34 of the high spool assembly 22. Therein, the airflow 48 is worked by multiple stages of vanes and blades driven by the rotating shaft 32 (not shown but known in the art), and exits under high pressure through the inlet 68A of the annular flowpath 66 of the duct 50. The airflow 48 then travels through the outlet 70A of the annular portion 56 and enters the circumferential flowpath 72 of the tubular portion 58. The mass flow rate generally increases along the flowpath 72 with the increasing flow cross section, and until the airflow 48 enters the re-directing flowpath 74 of the bent portion 60.

From the flowpath 74 of the bent portion 60 of the duct 50, at least a substantial portion of the airflow 48 is re-directed from the high spool assembly 22 and enters the combustor 30. Within the combustor 30, the airflow 48 is mixed with fuel (not shown), is ignited, and the airflow 48 (generally as combustion gas) enters the re-directing flowpath 74 of the bent portion 60 of the duct 52 for re-direction from the combustor 30 and toward the high spool assembly 22. The airflow 48 is re-directed within flowpath 74 and enters the circumferential flowpath 72 of the tubular portion 58. The tubular portion 58 generally acts as a dispersion manifold and distributes the airflow 48, circumferentially, through the inlet 70B of the annular flowpath 66 of the annular portion 56. The airflow 48 generally travels radially inward, along the flowpath 66, and exits through the outlet 68B.

From the outlet 68B of the annular flowpath 66 of the duct 52, the airflow 48 enters the HPT 36 of the high spool assembly 22 and energy is extracted through multiple stages of vanes and blades (not shown) that generally drive the shaft 32 for driving the HPC 34. From the HPT 36, the airflow 48 enters the re-directing flowpath 74 of the bent portion 60 of the duct 54 for re-direction from the high spool assembly 22 and toward the low spool assembly 26. The airflow 48 is redirected within flowpath 74 and enters the circumferential flowpath 72 of the tubular portion 58. The tubular portion 58 generally disperses or distributes the airflow 48, circumferentially, through the inlet 70B of the annular flowpath 66 of the annular portion 56. The airflow 48 generally travel radially inward, along the flowpath 66, and exits through the outlet 68B.

From the outlet 68B of the annular flowpath 66 of the duct 54, the airflow 48 enters the LPT 42 of the low spool assembly 26 and more energy is extracted through multiple stages of vanes and blades (not shown) that generally drive the shaft 38 for driving the LPC 40. From the LPT 42, the airflow 48 exits the engine 20 wherein the airflow may contribute toward at least a portion of the engine thrust.

With further regard to the present disclosure, de-coupling of the engine 20 enables a wide spectrum of engine packaging for any variety of engine applications including vertical lift applications that further includes helicopters as one, non-limiting, example. By eliminating the concentric orientation of more traditional engines, high operating pressure ratios are more easily obtained in a small packaging space. Furthermore and particularly for smaller engine core designs (e.g. core sizes 1 to 3), manufacturing tolerances are more easily maintained and/or improved since tolerances are no longer stacked from one spool to the next as is found in more traditional designs.

Figure 6:
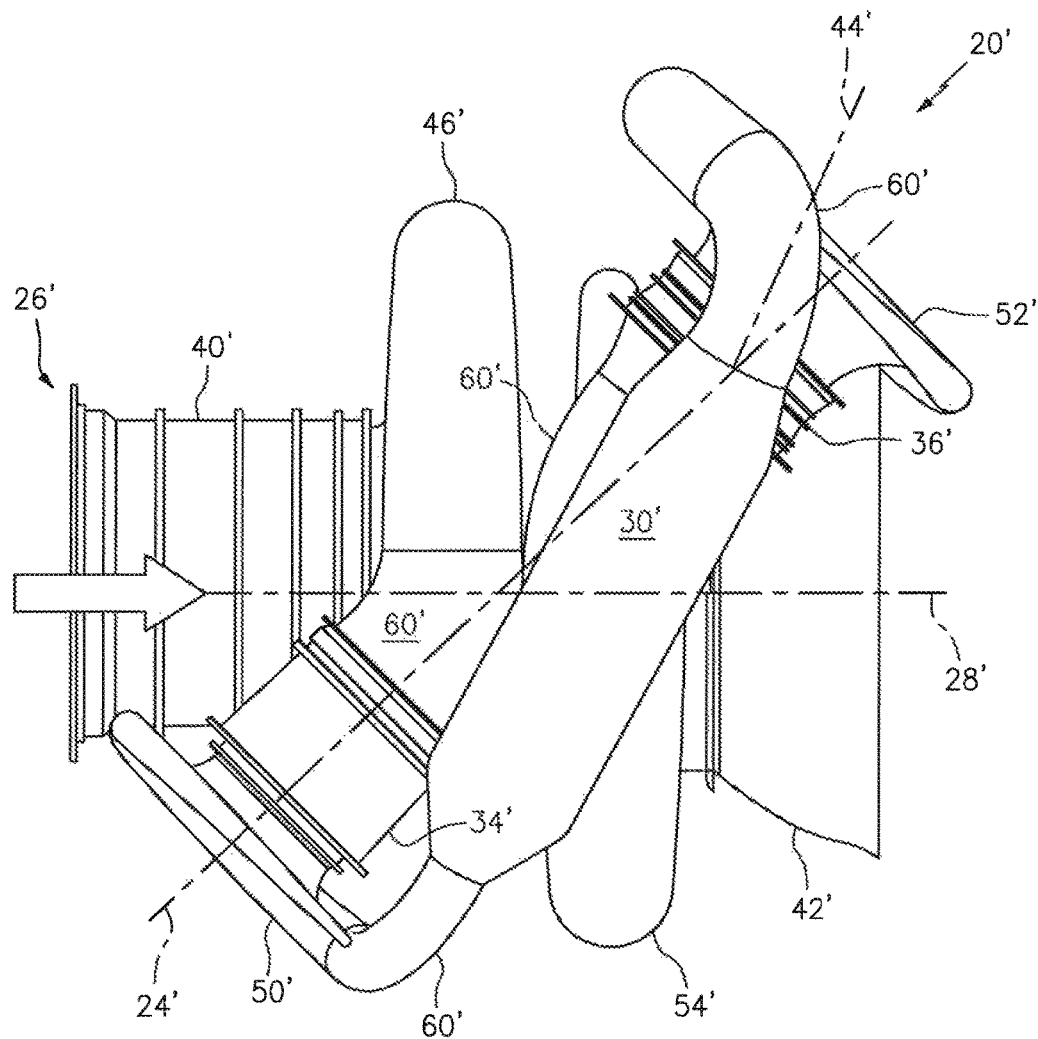
FIG. 6 is a perspective view of a second embodiment of a decoupled gas turbine engine.
Figure 7:
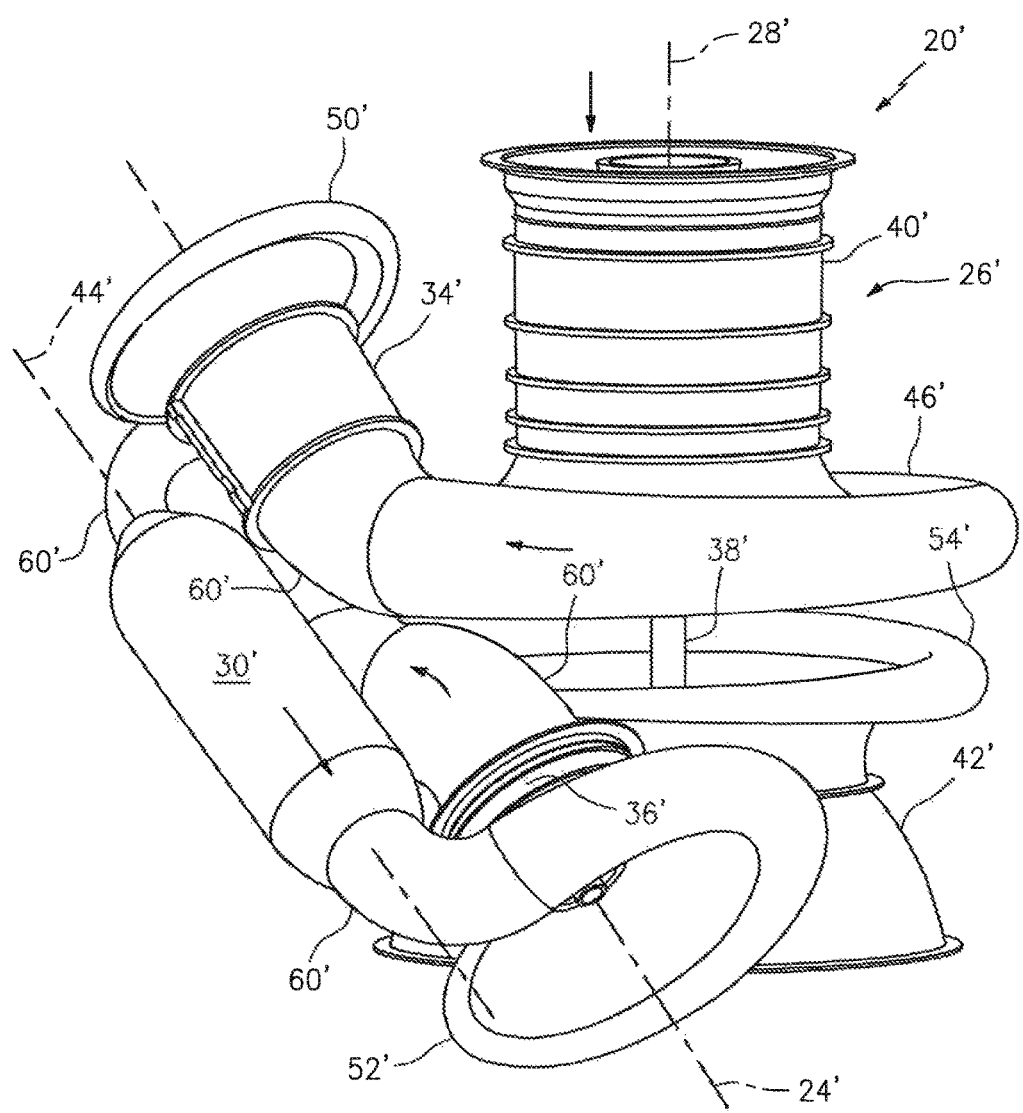
FIG. 7 is another perspective view of the engine of FIG. 6.

Referring to FIGS. 6 and 7, a second embodiment of the present disclosure is illustrated wherein like elements to the first embodiment have like identifying numerals except with the addition of a prime symbol. The engine 20' of the second embodiment has a high spool assembly 22' and a shaft orientated to rotate about a first axis 24', a low spool assembly 26' and a shaft 38' orientated to rotate about a second axis 28', and an interposed combustor 30'. The first and second axes 24', 28' are spaced apart, and thus not common to one-another. Unlike the first embodiment, the axes 24', 28' are not parallel to one-another but may be angled with respect to one-another. The combustor 30' includes a centerline 44' that may be spaced from the first and second axes 24', 28' of the respective high and low spool assemblies 22', 26'. Unlike the first embodiment, the centerline 44' may be angled with respect to both or at least one of the axes 24', 28'.

The engine 20' includes a first turning duct 46' for redirecting core airflow from a LPC 40' of the low spool assembly 26' to a HPC 34' of the high spool assembly 22', a second turning duct 50' for re-directing airflow from the HPC 34' to the combustor 30', a third turning duct 52' for re-directing airflow from the combustor 30' to a HPT 36' of the high spool assembly 22', and a fourth turning duct 54' for re-directing airflow from the HPT 36' to a LPT 42' of the low spool assembly 26'. Each turning duct 46', 50', 52', 54' may include a bent portion 60' that re-directs airflow as generally prescribed by the angular relationship between the axes 24' 28' of the spool assemblies and centerline 44' of the combustor 30'. In the present illustrations, the bent portions 60' of the duct 50' and the duct 52' may be angled by about eighty degrees, and the bent portions 60' of the duct 46' and the duct 54' may be angled by about forty-five degrees. It is further contemplated and understood that such angles of the bent portions 60' may generally be any angle and is dependent upon the packaging orientation of an engine application.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A decoupled gas turbine engine comprising:
a low pressure compressor;
a high pressure compressor;
a combustor;
a high pressure turbine;
a low pressure turbine;
a first turning duct in fluid communication between the high pressure compressor and the combustor; and
a second turning duct in fluid communication between the combustor and the high pressure turbine;
wherein the low pressure compressor and the low pressure turbine are rotatable about a first axis, and the high pressure compressor and the high pressure turbine are rotatable about a second axis that is non-coaxial with the first axis;
wherein the first turning duct and the second turning duct each include an annular portion having an annular flow cross section and a bent portion for re-directing airflow; and
wherein the first turning duct and the second turning duct each include a circumferential portion disposed and in fluid communication between the annular portion and the bent portion, and the circumferential portion has a diverging flow cross section as the circumferential portion extends circumferentially toward the bent portion.

2. The decoupled gas turbine engine set forth in claim 1, wherein the annular portion of the first turning duct is disposed downstream of and in fluid communication with the high pressure compressor and the bent portion of the first turning duct is disposed upstream of and in fluid communication with the combustor.

3. The decoupled gas turbine engine set forth in claim 1, wherein the bent portion of the second turning duct is disposed downstream of and in fluid communication with the combustor and the annular portion of the second turning duct is disposed upstream of and in fluid communication with the high pressure turbine.

4. The decoupled gas turbine engine set forth in claim 3, wherein the high pressure turbine is a radial in-flow turbine.

5. The decoupled gas turbine engine set forth in claim 1, wherein the first turning duct includes an upstream portion having radial inner and outer casings with respect to a compressor axis, and defining an annular flowpath communicating between a circumferentially continuous, axial facing, inlet and a circumferentially continuous, radially facing, outlet.

6. A gas turbine engine, comprising:
a low pressure compressor;
a high pressure compressor;
a combustor;
a high pressure turbine;
a low pressure turbine;
a first turning duct in fluid communication between the high pressure compressor and the combustor; and
a second turning duct in fluid communication between the combustor and the high pressure turbine;
wherein the low pressure compressor and the low pressure turbine are rotatable about a first axis, and the high pressure compressor and the high pressure turbine are rotatable about a second axis that is non-coaxial with the first axis;
wherein the first turning duct includes an upstream portion having radial inner and outer casings with respect to a compressor axis, and defining an annular flowpath communicating between a circumferentially continuous, axial facing, inlet and a circumferentially continuous, radially facing, outlet; and
wherein the first turning duct includes a generally tubular portion engaged to the upstream portion and defining a circumferential flowpath in lateral communication with the outlet and having a flow cross section that diverges toward an end of the circumferential flowpath, and includes a downstream portion engaged to the tubular portion and defining a re-directing flowpath in fluid communication with the end of the circumferential flowpath.

* * * * *